(12) United States Patent
Kwon et al.

(10) Patent No.: US 9,431,903 B2
(45) Date of Patent: *Aug. 30, 2016

(54) DC-DC CONVERTER AND ORGANIC LIGHT EMITTING DISPLAY INCLUDING THE SAME

(71) Applicant: SAMSUNG DISPLAY CO., LTD., Yongin, Gyeonggi-Do (KR)

(72) Inventors: Soon-Gi Kwon, Yongin (KR); Sung-Cheon Park, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/614,012

(22) Filed: Feb. 4, 2015

(65) Prior Publication Data

US 2015/0155779 A1 Jun. 4, 2015

Related U.S. Application Data

(63) Continuation of application No. 13/586,103, filed on Aug. 15, 2012, now Pat. No. 8,952,954.

(30) Foreign Application Priority Data

Mar. 14, 2012 (KR) ........................ 10-2012-0026009

(51) Int. Cl.
*G09G 3/32* (2016.01)
*H02M 3/156* (2006.01)
(Continued)

(52) U.S. Cl.
CPC ................ *H02M 3/156* (2013.01); *G05F 1/24* (2013.01); *G09G 3/3233* (2013.01);
(Continued)

(58) Field of Classification Search
CPC .......... H02M 3/158; H02M 3/28; G06F 1/32
USPC .......................... 318/140–158; 323/282–290
See application file for complete search history.

(56) References Cited

U.S. PATENT DOCUMENTS

| 5,479,329 A | 12/1995 | Motonobu et al. |
| 2006/0171178 A1* | 8/2006 | Shvarts ..................... H02J 1/10 363/65 |

(Continued)

FOREIGN PATENT DOCUMENTS

| CN | 101231818 A | 7/2008 |
| CN | 101645652 A | 2/2010 |

(Continued)

OTHER PUBLICATIONS

Search Report dated Sep. 23, 2014, in corresponding European application No. 12186648.7.

(Continued)

*Primary Examiner* — Dwayne Bost
*Assistant Examiner* — Sepehr Azari
(74) *Attorney, Agent, or Firm* — Lee & Morse, P.C.

(57) ABSTRACT

A DC-DC converter includes a first power source generator, the first power source generator including an input port and a first output port, the first power source generator being configured to receive an input power source to the input port, and being configured to generate a first power source, the first power source being output to the first output port, and a selecting unit, the selecting unit being configured to selectively transmit, to the first power source generator, one of: a feedback voltage, the feedback voltage being input from an external feedback wiring line via a feedback terminal, and a voltage of the first output port.

20 Claims, 4 Drawing Sheets

(51) Int. Cl.
*H02M 3/158* (2006.01)
*G05F 1/24* (2006.01)
*H02M 1/00* (2006.01)

(52) U.S. Cl.
CPC .......... *G09G 3/3258* (2013.01); *H02M 3/158* (2013.01); *G09G 2310/0264* (2013.01); *G09G 2310/0278* (2013.01); *G09G 2320/0233* (2013.01); *G09G 2320/04* (2013.01); *G09G 2330/00* (2013.01); *G09G 2330/08* (2013.01); *G09G 2330/12* (2013.01); *H02M 2001/0025* (2013.01)

(56) References Cited

U.S. PATENT DOCUMENTS

| | | | |
|---|---|---|---|
| 2008/0164828 A1* | 7/2008 | Szczeszynski | G05F 1/46 315/300 |
| 2008/0174287 A1 | 7/2008 | Park | |
| 2009/0184751 A1* | 7/2009 | Park | G06F 1/563 327/535 |
| 2010/0033514 A1* | 2/2010 | Park | G09G 3/2011 345/690 |
| 2010/0127678 A1* | 5/2010 | Inatomi | H02M 1/32 323/282 |
| 2011/0043505 A1* | 2/2011 | Ahn | H02M 3/07 345/211 |
| 2011/0316838 A1 | 12/2011 | Ahn | |
| 2012/0206427 A1* | 8/2012 | Yamamuro | H04B 33/0851 345/207 |
| 2013/0229829 A1* | 9/2013 | Zhang | H02M 3/33546 363/16 |

FOREIGN PATENT DOCUMENTS

| | | |
|---|---|---|
| CN | 102237036 A | 11/2011 |
| KR | 10-2005-0015099 A | 2/2005 |
| KR | 10-2008-0050710 A | 6/2008 |
| KR | 10-2011-0018782 A | 4/2011 |

OTHER PUBLICATIONS

Chinese Office Action dated Jun. 7, 2016 in Corresponding Chinese Patent Application No. 201210342804.0.

* cited by examiner

DC-DC CONVERTER AND ORGANIC LIGHT EMITTING DISPLAY INCLUDING THE SAME

CROSS-REFERENCE TO RELATED APPLICATIONS

This is a continuation application based on pending application Ser. No. 13/586,103 filed Aug. 15, 2012, the entire contents of which is hereby incorporated by reference.

This application claims priority to and the benefit of Korean Patent Application No. 10-2012-0026009, filed on Mar. 14, 2012, in the Korean Intellectual Property Office, the entire content of which is incorporated herein by reference.

BACKGROUND

1. Field

Embodiments relate to a DC-DC converter and an organic light emitting display including the same.

2. Description of the Related Art

Recently, various flat panel displays (FPD) capable of reducing weight and volume that are disadvantages of cathode ray tubes (CRT) have been developed. The FPDs include liquid crystal displays (LCD), field emission displays (FED), plasma display panels (PDP), and organic light emitting displays.

Among the FPDs, the organic light emitting displays display images using organic light emitting diodes (OLED) that generate light by re-combination of electrons and holes. The organic light emitting display has high response speed and is driven with low power consumption.

SUMMARY

Embodiments are directed to a DC-DC converter, including a first power source generator, the first power source generator including an input port and a first output port, the first power source generator being configured to receive an input power source to the input port, and being configured to generate a first power source, the first power source being output to the first output port, and a selecting unit, the selecting unit being configured to selectively transmit, to the first power source generator, one of: a feedback voltage, the feedback voltage being input from an external feedback wiring line via a feedback terminal, and a voltage of the first output port.

The selecting unit may be configured to calculate a voltage difference between the feedback voltage and the voltage of the first output port, the selecting unit may be configured to select one of the feedback voltage and the voltage of the first output port to correspond to the calculated voltage difference, and the selecting unit may be configured to transmit the selected voltage to the first power source generator.

The selecting unit may include a calculating unit, the calculating unit being configured to calculate the voltage difference between the feedback voltage and the voltage of the first output port, and a feedback controller, the feedback controller being configured to compare the voltage difference calculated by the calculating unit with a predetermined first reference voltage, the feedback controller being configured to transmit the voltage of the first output port to the first power source generator when the voltage difference is smaller than the first reference voltage, and to transmit the feedback voltage to the first power source generator when the voltage difference is not less than the first reference voltage.

The feedback controller may be configured to stop driving of the first power source generator when the voltage difference is not less than a predetermined second reference voltage.

The second reference voltage may have a larger value than the first reference voltage.

The first power source generator may include a first inductor coupled between the input port and a first node, a first transistor coupled between the first node and a ground power source, a second transistor coupled between the first node and the first output port, a first switching controller, the first switching controller being configured to control the first transistor and the second transistor, and a first voltage distributing unit, the first voltage distributing unit being configured to divide a voltage supplied from the feedback controller, and being configured to supply the divided voltage to the first switching controller.

The first voltage distributing unit may include a plurality of serially coupled resistors.

Embodiments are also directed to an organic light emitting display, including a display panel including a plurality of pixels, the pixels each being coupled to a scan line, a data line, and a first power source line, and a DC-DC converter provided outside the display panel, the DC-DC converter being configured to generate a first power source and to supply the generated first power source to each of the pixels through the first power source line, the DC-DC converter including a first power source generator, the first power source generator including an input port and a first output port, the first power source generator being configured to receive an input power source to the input port, and being configured to generate a first power source, the first power source being output to the first output port, and a selecting unit, the selecting unit being configured to selectively transmit, to the first power source generator, one of a feedback voltage, the feedback voltage being input from an external feedback wiring line via a feedback terminal, and a voltage of the first output port.

The selecting unit may be configured to calculate a voltage difference between the feedback voltage and the voltage of the first output port, the selecting unit may be configured to select one of the feedback voltage and the voltage of the first output port to correspond to the calculated voltage difference, and the selecting unit may be configured to transmit the selected voltage to the first power source generator.

The selecting unit may include a calculating unit, the calculating unit being configured to calculate the voltage difference between the feedback voltage and the voltage of the first output port, and a feedback controller, the feedback controller being configured to compare the voltage difference calculated by the calculating unit with a predetermined first reference voltage, the feedback controller being configured to transmit the voltage of the first output port to the first power source generator when the voltage difference is smaller than the first reference voltage, and to transmit the feedback voltage to the first power source generator when the voltage difference is not less than the first reference voltage.

The feedback controller may be configured to stop driving of the first power source generator when the voltage difference is not less than a predetermined second reference voltage.

The second reference voltage may have a larger value than the first reference voltage.

The DC-DC converter may be electrically coupled to the display panel through a flexible printed circuit board (FPCB).

The first power source generator may include a first inductor coupled between the input port and a first node, a first transistor coupled between the first node and a ground power source, a second transistor coupled between the first node and the first output port, a first switching controller, the first switching controller being configured to control the first transistor and the second transistor, and a first voltage distributing unit, the first voltage distributing unit being configured to divide a voltage supplied from the feedback controller, and being configured to supply the divided voltage to the first switching controller.

The first voltage distributing unit may include a plurality of serially coupled resistors.

The organic light emitting display may further include a scan driver, the scan driver being configured to supply scan signals to the pixels through the scan lines, and a data driver, the data driver being configured to supply data signals to the pixels through the data lines.

BRIEF DESCRIPTION OF THE DRAWINGS

The above and other features and advantages will become more apparent to those of skill in the art by describing in detail example embodiments thereof with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, a DC-DC converter and an organic light emitting display including the same will be described.

Figure 1:
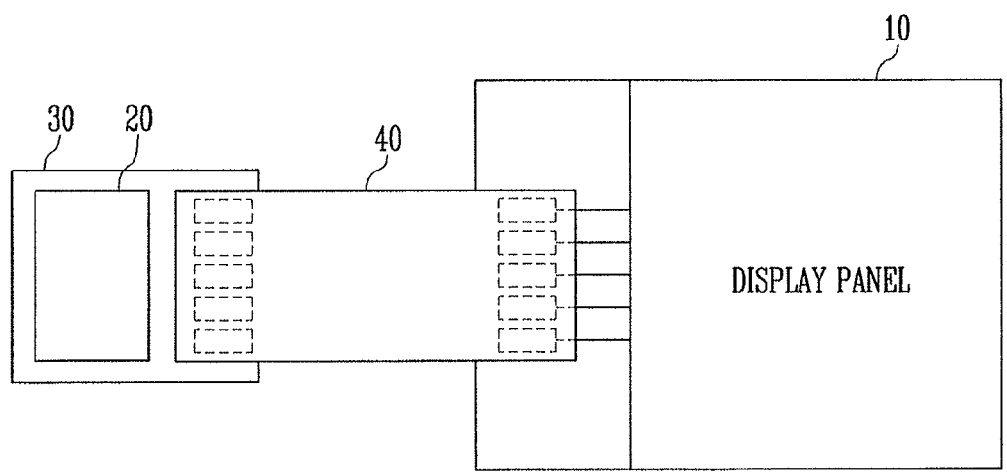
FIG. 1 is a view illustrating an organic light emitting display according to an embodiment.
Figure 2:
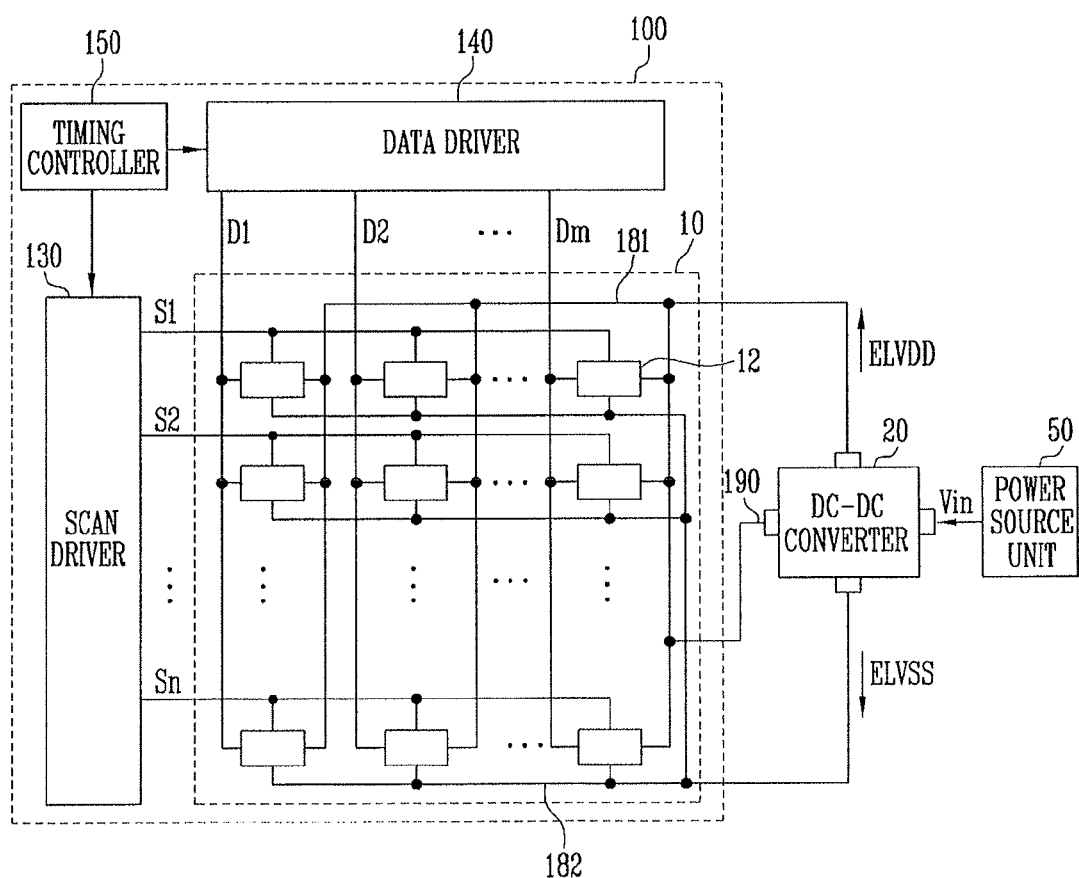
FIG. 2 is a view illustrating the detailed structure of the organic light emitting display of FIG. 1.

FIG. 1 is a view illustrating an organic light emitting display according to an embodiment. FIG. 2 is a view illustrating the detailed structure of the organic light emitting display of FIG. 1.

Referring to FIG. 1, the organic light emitting display according to an example embodiment includes a display panel 10 and a DC-DC converter 20.

In the present example embodiment, the display panel 10 includes a plurality of pixels 12 to display a predetermined image.

In the present example embodiment, the DC-DC converter 20 is positioned outside the display panel 10 to generate power sources required for the display panel 10 and to supply the generated power sources.

The DC-DC converter 20 may be electrically coupled to the display panel 10 through a flexible printed circuit board (FPCB) 40 while being mounted on a printed circuit board (PCB) 30. In another implementation, the DC-DC converter 20 may be directly mounted on the FPCB 40 and may be electrically coupled to the display panel 10 through a PCB that does not have flexibility.

The DC-DC converter 20 may not be directly mounted on the display panel 10, but instead may be positioned outside the display panel 10 to be electrically coupled to the display panel 10 through the PCBs 30 and 40. Thus, the voltage of the power source output from the DC-DC converter 20 may be reduced while passing through the PCBs 30 and 40.

Referring to FIG. 2, the detailed structure of the organic light emitting display according to the embodiment will be described.

In the present example embodiment, the organic light emitting display includes a display panel 10 including a plurality of pixels 12 coupled to scan lines S1 to Sn, data lines D1 to Dm, a first power source line 181, and a second power source line 182, a scan driver 130 for supplying scan signals to the pixels 12 through the scan lines S1 to Sn, a data driver 140 for supplying data signals to the pixels 12 through the data lines D1 to Dm, a timing controller 150 for controlling the scan driver 130 and the data driver 140, and the DC-DC converter 20 for supplying a first power source ELVDD and a second power source ELVSS to the pixels 12 through the first power source line 181 and the second power source line 182.

In the present example embodiment, the pixels 12 that receive the first power source ELVDD and the second power source ELVSS from the DC-DC converter 20 through the first power source line 181 and the second power source line 182 generate light components corresponding to the data signals by the current that flows from the first power source ELVDD to the second power source ELVSS via organic light emitting diodes (OLED).

The scan driver 130 generates the scan signals by the control of the timing controller 150 and supplies the generated scan signals to the scan lines S1 to Sn.

The data driver 140 generates the data signals by the control of the timing controller 150 and supplies the generated data signals to the data lines D1 to Dm.

When the scan signals are sequentially supplied to the scan lines S1 to Sn, the pixels 12 are sequentially selected by lines and the selected pixels 12 receive the data signals transmitted from the data lines D1 to Dm.

When the scan driver 130, the data driver 140, and the timing controller 150 are provided in the display panel 10, the scan driver 130, the data driver 140, and the timing controller 150 may be referred to as a display module 100.

Figure 3:
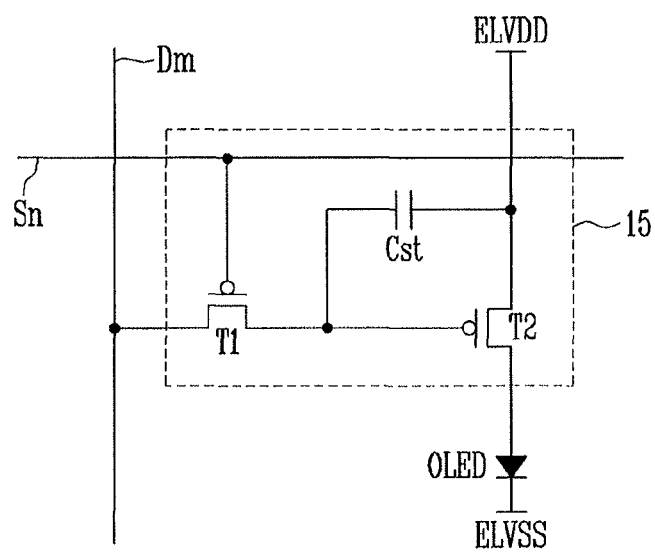
FIG. 3 is a view illustrating an embodiment of the pixel of FIG. 2.

FIG. 3 is a view illustrating an embodiment of the pixel of FIG. 2. In FIG. 3, for convenience sake, the pixel coupled to the nth scan line Sn and the mth data line Dm are illustrated.

In the present example embodiment, each of the pixels 12 includes a pixel circuit 15 (coupled to the OLED, the data line Dm, and the scan line Sn) to control the OLED.

In the present example embodiment, the anode electrode of the OLED is coupled to the pixel circuit 15 and the cathode electrode of the OLED is coupled to the second power source ELVSS.

In the present example embodiment, the OLED generates light of predetermined brightness to correspond to the current supplied from the pixel circuit 15. The pixel circuit 15 controls the amount of current supplied to the OLED to correspond to the data signal supplied to the data line Dm when the scan signal is supplied to the scan line Sn.

In the present example embodiment, the pixel circuit 15 includes a second transistor T2 coupled between the first power source ELVDD and the OLED, a first transistor T1 coupled among the second transistor T2, the data line Dm, and the scan line Sn, and a storage capacitor Cst coupled between the gate electrode of the second transistor T2 and the first electrode of the second transistor T2.

The gate electrode of the first transistor T1 is coupled to the scan line Sn and the first electrode of the first transistor T1 is coupled to the data line Dm.

The second electrode of the first transistor T1 is coupled to one terminal of the storage capacitor Cst.

The first electrode is set as one of a source electrode and a drain electrode, and the second electrode is set as an electrode different from the first electrode. For example, when the first electrode is set as the source electrode, the second electrode is set as the drain electrode.

The first transistor T1 (coupled to the scan line Sn and the data line Dm) is turned on when the scan signal is supplied from the scan line Sn, so as to supply the data signal supplied from the data line Dm to the storage capacitor Cst. At this time, the storage capacitor Cst charges the voltage corresponding to the data signal.

The gate electrode of the second transistor T2 is coupled to one terminal of the storage capacitor Cst, and the first electrode of the second transistor T2 is coupled to the other terminal of the storage capacitor Cst and the first power source ELVDD. The second electrode of the second transistor T2 is coupled to the anode electrode of the OLED.

The second transistor T2 controls the amount of current that flows from the first power source ELVDD to the second power source ELVSS via the OLED to correspond to the voltage value stored in the storage capacitor Cst. At this time, the OLED generates the light corresponding to the amount of current supplied from the second transistor T2.

The above-described structure of the pixel of FIG. 3 is only an example embodiment, and the pixel circuit 15 may have various circuit structures for supplying current to the OLED.

In the present example embodiment, the DC-DC converter 20 receives an input power source Vin from the power source unit 50 to convert the input power source Vin, and to generate the first power source ELVDD and the second power source ELVSS supplied to the pixels 12.

As described above, the DC-DC converter 20 may be electrically coupled to the first power source line 181 and the second power source line 182 that exist in the display panel 10 by the FPCB 40. The DC-DC converter 20 may supply the first power source ELVDD and the second power source ELVSS to the pixels 12 through the first power source line 181 and the second power source line 182.

The first power source ELVDD is preferably set as a positive polarity voltage and the second power source ELVSS is preferably set as a negative polarity voltage.

The power source unit 50 may be, e.g., a battery for providing a direct current (DC) power source to the input port IN of the DC-DC converter 20, a rectifying apparatus for converting an alternating current (AC) power source into the DC power source to output the DC power source, etc.

Figure 4:
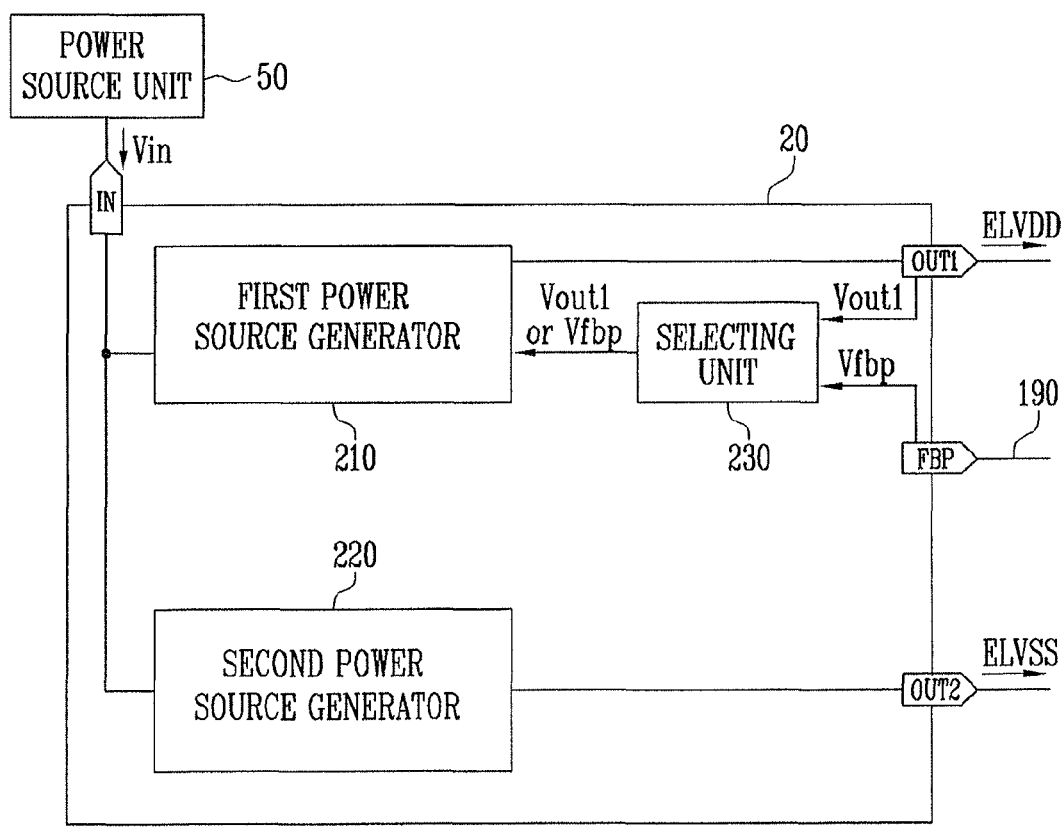
FIG. 4 is a view illustrating a DC-DC converter according to the embodiment.
Figure 5:
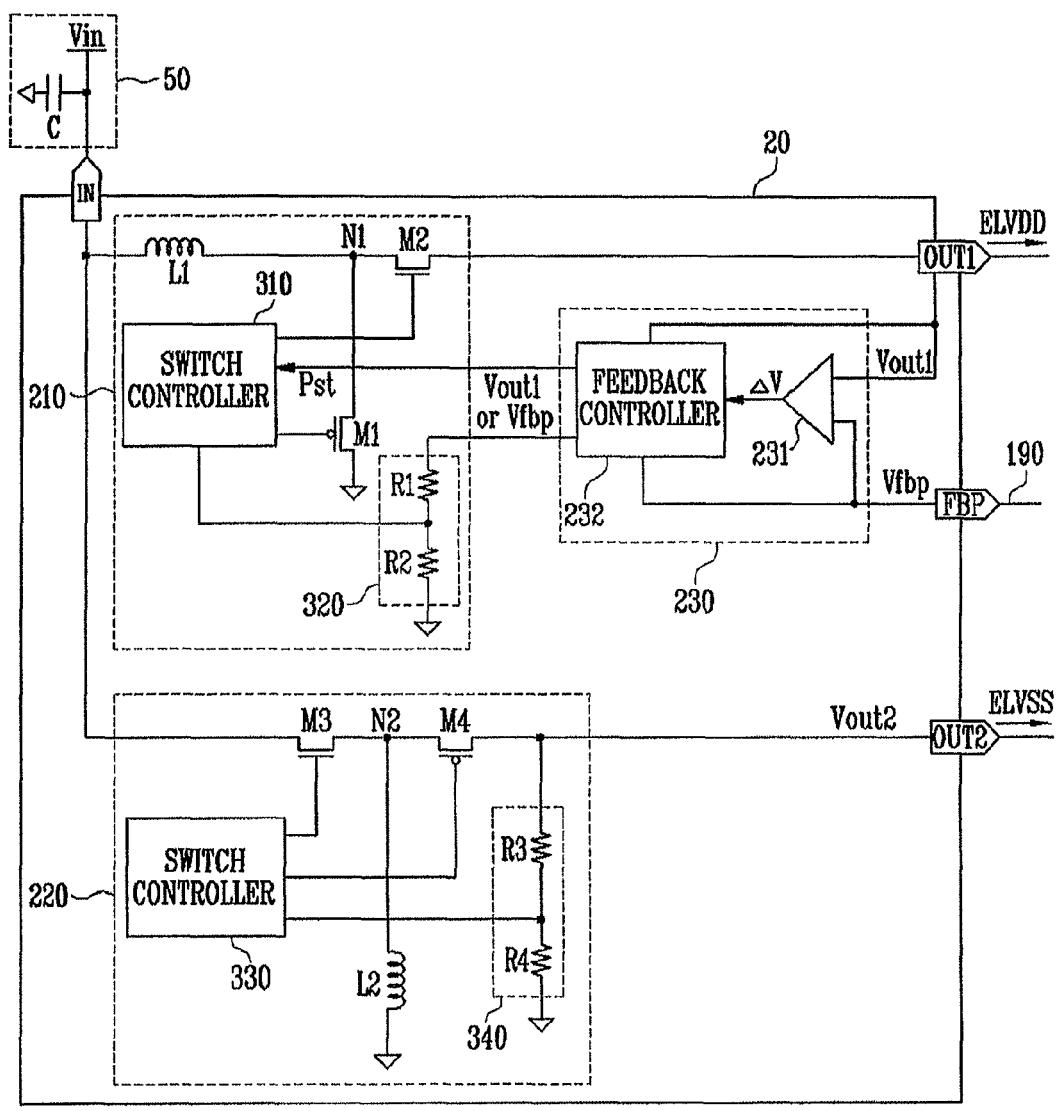
FIG. 5 is a view illustrating the detailed structure of the DC-DC converter of FIG. 4.

FIG. 4 is a view illustrating a DC-DC converter according to the embodiment. FIG. 5 is a view illustrating the detailed structure of the DC-DC converter of FIG. 4.

Referring to FIG. 4, the DC-DC converter 20 according to the present example embodiment may include a first power source generator 210, a second power source generator 220, and a selecting unit 230.

In the present example embodiment, the first power source generator 210 receives the input power source Vin supplied from the power source unit 50 to the input port IN to generate the first power source ELVDD, and outputs the first power source ELVDD to a first output port OUT1. The first power source ELVDD may be supplied to the pixels 12 through the first power source line 181 electrically coupled to the first output port OUT I.

In the present example embodiment, the first power source generator 210 increases the voltage of the input power source Vin using internal elements to generate the first power source ELVDD. In addition, the first power source generator 210, as a boost type converter that increases the voltage of the input power source Vin, may generate the first power source ELVDD having a positive polarity voltage.

In an example embodiment, referring to FIG. 5, the first power source generator 210 may include a first inductor L1, a first transistor M1, a second transistor M2, a first switching controller 310, and a first voltage distributing unit 320.

The first inductor L1 is coupled between the input port IN and a first node N1.

The first transistor M1 is coupled between the first node N1 and a ground power source.

The second transistor M2 is coupled between the first node N1 and the first output port OUT1.

The first switching controller 310 controls the first transistor M1 and the second transistor M2. In addition, the first switching controller 310 controls the on and off operations of the first transistor M1 and the second transistor M2 to convert the input power source Vin into the first power source ELVDD having a desired voltage level.

The first voltage distributing unit 320 divides a voltage supplied from the selecting unit 230 (the voltage Vout1 of the first output port OUT1 or a feedback voltage Vfbp) to supply the divided voltage to the first switching controller 310.

The first voltage distributing unit 320 may include a plurality of serially coupled resistors (for example, R1 and R2).

The first switching controller 310 that receives the voltage divided by the first voltage distributing unit 320 controls the duty ratios of the first transistor M1 and the second transistor M2 to correspond to the divided voltage to generate a desired first power source ELVDD.

The first transistor M1 and the second transistor M2 may be alternately turned on, and may have different conductivity types. For example, when the first transistor M1 is a P type, the second transistor M2 may be an N type.

The structure of the above-described first power source generator 210 is merely an example, and embodiments are not limited to the above.

In the present example embodiment, the second power source generator 220 receives the input power source Vin supplied from the power source unit 50 to the input port IN to generate the second power source ELVSS, and outputs the second power source ELVSS to a second output port OUT2. The second power source ELVSS may be supplied to the pixels 12 through the second power source line 182 electrically coupled to the second output port OUT2.

The second power source generator 220 converts the voltage of the input power source Vin using internal elements to generate the second power source ELVSS.

In addition, the second power source generator 220, as a buck type converter for reducing the voltage of the input power source Vin, preferably generates the second power source ELVSS having a negative polarity voltage.

In an example embodiment, referring to FIG. 5, the second power source generator 220 may include a second inductor L2, a third transistor M3, a fourth transistor M4, a second switching controller 330, and a second voltage distributing unit 340.

The third transistor M3 is coupled between the input end IN and a second node N2.

The fourth transistor M4 is coupled between the second node N2 and the second output port OUT2.

The second inductor L2 is coupled between the second node N2 and a ground power source.

The second switching controller 330 controls the third transistor M3 and the fourth transistor M4. In addition, the second switching controller 330 controls the on and off operations of the third transistor M3 and the fourth transistor M4 to convert the input power source Vin into the second power source ELVSS having a desired voltage level.

The second voltage distributing unit 340 divides the voltage Vout2 transmitted from the second output port OUT2 to supply the divided voltage to the second switching controller 330.

The second voltage distributing unit 340 may include a plurality of serially coupled resistors (for example, R3 and R4).

The second switching controller 330 that receives the voltage divided by the second voltage distributing unit 340 controls the duty ratios of the third transistor M3 and the fourth transistor M4 to correspond to the divided voltage to generate the desired second power source ELVSS.

The third transistor M3 and the fourth transistor M4 may be alternately turned on and may have different conductivity types. For example, when the third transistor M3 is the N type, the fourth transistor M4 may be the P type.

The above-described structure of the second power source generator 220 is only an example, and embodiments are not limited to the above.

The selecting unit 230 may selectively transmit, to the first power source generator 210, one of: the feedback voltage Vfbp input to the feedback terminal FBP of the DC-DC converter 20, and the voltage Vout1 of the first output port OUT1.

The first power source generator 210 may properly control the voltage level of the output first power source ELVDD by reflecting the voltage (the feedback voltage Vfbp) fed-back by the selecting unit 230 or the voltage Vout1 of the first output port OUT1.

Figure 6:
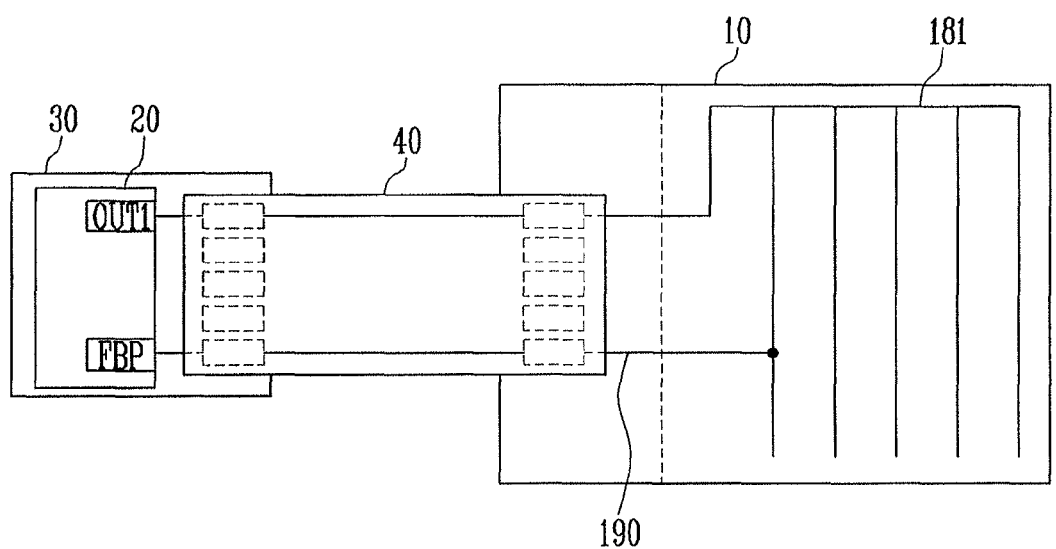
FIG. 6 is a view additionally illustrating a feedback wiring line in the organic light emitting display of FIG. 1.

In an example embodiment, referring to FIG. 6, a feedback wiring line 190 as a wiring line for electrically coupling the first power source line 181 and the feedback terminal FBP that exist in the display panel 10 may input the voltage of the first power source line 181 to the feedback terminal FBP. In addition, the feedback wiring line 190 may be extended through at least one circuit board 30 and 40 in order to electrically couple the first power source line 181 and the feedback terminal FBP to each other.

A predetermined voltage difference exists between the voltage Vout1 of the first output port OUT1 of the DC-DC converter 20 and the voltage of the first power source line 181 in the display panel 10 coupled to the pixels 12. In order to correctly control the first power source generator 210, the feedback voltage used by the display panel 10 may be used as the feedback voltage, instead of the voltage Vout1 of the first output port OUT1. Therefore, the feedback wiring line 190 and the selecting unit 230 electrically coupled to the first power source line 181 that exists in the display panel 10 may be provided so that one of the voltage Vout1 of the first output port OUT1 and the feedback voltage Vfbp may be selectively supplied to the first power source generator 210.

In the present example embodiment, the selecting unit 230 receives the feedback voltage Vfbp and the voltage Vout1 of the first output port OUT1 to calculate a voltage difference between the two voltages, and selects the voltage to be transmitted to the first power source generator 210 from the two voltages to correspond to the calculated voltage difference.

The selecting unit 230 according to the present example embodiment may include a calculating unit 231 for performing the above-described function and a feedback controller 232.

The calculating unit 231 receives the feedback voltage Vfbp and the voltage Vout1 of the first output port OUT1 to calculate a voltage difference $\Delta V$ between the two voltages and transmits the calculated voltage difference $\Delta V$ to the feedback controller 232.

The feedback controller 232 selects a voltage to be transmitted to the first power source generator 210 from the feedback voltage Vfbp and the voltage Vout1 of the first output port OUT1 with reference to the voltage difference $\Delta V$ transmitted from the calculating unit 231. For example, the feedback controller 232 compares a predetermined first reference voltage Vref1 with the voltage difference $\Delta V$ calculated by the calculating unit 231, to transmit the voltage Vout1 of the first output port OUT1 to the first power source generator 210 when the voltage difference $\Delta V$ is smaller than the first reference voltage Vref1, and to transmit the feedback voltage Vfbp to the first power source generator 210 when the voltage difference $\Delta V$ is no less than the first reference voltage Vref1.

When the difference between the voltage Vout1 of the first output port OUT1 and the feedback voltage Vfbp is small, the voltage Vout1 of the first output port OUT1 may be fed-back to the first power source generator 210. When the difference between the voltage Vout1 of the first output port OUT1 and the feedback voltage Vfbp is large, the feedback voltage Vfbp is fed-back to the first power source generator 210. Therefore, the first power source generator 210 may be effectively controlled.

At this time, the feedback controller 232 may stop the driving of the first power source generator 210 when the voltage difference $\Delta V$ calculated by the calculating unit 231 is no less than a predetermined second reference voltage Vref2. When the first power source line 181 that exists in the display panel 10 is broken or shorted from another wiring line, the voltage difference $\Delta V$ between the feedback voltage Vfbp and the voltage Vout1 of the first output port OUT1 may become significantly large. Therefore, when the voltage difference $\Delta V$ is no less than the second reference voltage Vref2, the driving of the first power source generator 210 is stopped to prevent additional damage from being caused as a result of the first power source line 181 being broken or shorted. Therefore, when the voltage difference $\Delta V$ is no less than the second reference voltage Vref2, the feedback controller 232 may supply a driving stop signal Pst to the first switching controller 310 of the first power source generator 210.

The first switching controller 310 that receives the driving stop signal Pst turns off all of the transistors (for example, M1 and M2) included in the first power source generator 210 to stop the driving of the first power source generator 210.

In addition, the feedback controller 232 may supply the driving stop signal Pst to the second switching controller 330 of the second power source generator 220 when the voltage difference ΔV is no less than the second reference voltage Vref2. The second switching controller 330 that receives the driving stop signal Pst turns off all of the transistors (for example, M3 and M4) included in the second power source generator 220 to stop the driving of the second power source generator 220.

The first reference voltage Vref1 and the second reference voltage Vref2 may be variously set. The second reference voltage Vref2 is preferably set to have a larger value than the first reference voltage Vref1.

By way of summation and review, an organic light emitting display may include a display panel, including a plurality of pixels to display an image, and a DC-DC converter for supplying a power source from the outside of the display panel to the display panel through a flexible printed circuit board (FPCB).

The DC-DC converter may convert an external power source to generate power sources required for driving the display panel. A power source output to an output port may be fed back to the DC-DC converter in order to control the voltage of the output power source. A voltage drop may be generated by a FPCB that exists between the display panel and the DC-DC converter. Thus, a voltage of the power source input to the display panel may be lower than the output voltage of the DC-DC converter. Where a voltage higher than the voltage of the power source used for the display panel is fed back to a general DC-DC converter, a power source having a lower voltage than required for the display panel may be output. Therefore, the brightness of the display panel may be lower than a target brightness.

As described above, embodiments relate to a DC-DC converter capable of feeding back the voltage of the power source in a display panel to prevent brightness from deteriorating and an organic light emitting display including the same. An embodiment may provide a DC-DC converter capable of selectively feeding back a voltage of the output port of the DC-DC converter and a voltage of the power source in a display panel, so as to correctly control the voltage of an output power source and to prevent the brightness of the display panel from deteriorating. An embodiment also provides an organic light emitting display including the DC-DC converter.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A DC-DC converter, comprising:
    a power source generator including an input port and an output port, the power source generator to receive an input power source voltage from the input port, and to generate a power source voltage, the power source voltage being a positive voltage or a negative voltage to be output to the output port; and
    a selector to selectively transmit to the power source generator:
    a feedback voltage input from an external feedback wiring line via a feedback terminal, or
    a voltage of the output port.

2. The DC-DC converter as claimed in claim 1, wherein:
    the selector is to calculate a voltage difference between the feedback voltage and the voltage of the output port,
    the selector is to select one of the feedback voltage or the voltage of the output port to correspond to the calculated voltage difference, and
    the selector is to transmit the selected voltage to the power source generator.

3. The DC-DC converter as claimed in claim 2, wherein the selector includes:
    a calculator to calculate the voltage difference between the feedback voltage and the voltage of the output port; and
    a feedback controller, to compare the voltage difference calculated by the calculator with a predetermined first reference voltage, the feedback controller to transmit the voltage of the output port to the power source generator when a second condition is satisfied, the second condition including when the voltage difference is smaller than the first reference voltage, and to transmit the feedback voltage to the power source generator when a first condition is satisfied, the first condition including when the voltage difference is not less than the first reference voltage.

4. The DC-DC converter as claimed in claim 3, wherein the feedback controller is to stop driving of the power source generator when the voltage difference is not less than a predetermined second reference voltage.

5. The DC-DC converter as claimed in claim 4, wherein the second reference voltage has a larger value than the first reference voltage.

6. The DC-DC converter as claimed in claim 1, wherein the power source voltage is a positive voltage.

7. The DC-DC converter as claimed in claim 1, wherein the power source voltage is a negative voltage.

8. An organic light emitting display, comprising:
    a display panel including a plurality of pixels, the pixels each being coupled to a scan line, a data line, and a power source line; and
    a DC-DC converter provided outside the display panel, the DC-DC converter to generate a power source and to supply the generated power source to each of the pixels through the power source line, the DC-DC converter including:
    a power source generator, the power source generator including an input port and an output port, the power source generator to receive an input power source to the input port, and to generate the power source voltage, the power source voltage being a positive voltage or a negative voltage to be output to the output port; and
    a selector to selectively transmit to the power source generator:
    a feedback voltage, the feedback voltage being input from an external feedback wiring line via a feedback terminal, and
    a voltage of the output port.

9. The organic light emitting display as claimed in claim 8, wherein:
    the selector is to calculate a voltage difference between the feedback voltage and the voltage of the output port, the selector is to select one of the feedback voltage or the voltage of the output port to correspond to the calculated voltage difference, and the selector is to transmit the selected voltage to the power source generator.

10. The organic light emitting display as claimed in claim 9, wherein the selector includes:
   a calculator to calculate the voltage difference between the feedback voltage and the voltage of the output port; and
   a feedback controller to compare the voltage difference calculated by the calculator with a predetermined first reference voltage, the feedback controller to transmit the voltage of the output port to the power source generator when a second condition is satisfied, the second condition including when the voltage difference is smaller than the first reference voltage, and to transmit the feedback voltage to the power source generator when a first condition is satisfied, the first condition including when the voltage difference is not less than the first reference voltage.

11. The organic light emitting display as claimed in claim 10, wherein the feedback controller is to stop driving of the power source generator when the voltage difference is not less than a predetermined second reference voltage.

12. The organic light emitting display as claimed in claim 11, wherein the second reference voltage has a larger value than the first reference voltage.

13. The organic light emitting display as claimed in claim 8, wherein the DC-DC converter is electrically coupled to the display panel through a flexible printed circuit board (FPCB).

14. The organic light emitting display as claimed in claim 8, further comprising:
   a scan driver to supply scan signals to the pixels through the scan lines; and
   a data driver to supply data signals to the pixels through the data lines.

15. The organic light emitting display as claimed in claim 8, wherein the external feedback wiring line is coupled between the power source line in the display panel and the feedback terminal.

16. The organic light emitting display as claimed in claim 8, wherein each of the pixels includes:
   an organic light emitting diode coupled to a second power source voltage; and
   a transistor coupled between a first power source voltage and the organic light emitting diode.

17. The organic light emitting display as claimed in claim 16, wherein the first power source voltage is the power source voltage output from the power source generator.

18. The organic light emitting display as claimed in claim 16, wherein the second power source voltage is the power source voltage output from the power source generator.

19. The organic light emitting display as claimed in claim 8, wherein the power source voltage is a positive voltage.

20. The organic light emitting display as claimed in claim 8, wherein the power source voltage is a negative voltage.

* * * * *